United States Patent Office 3,079,373
Patented Feb. 26, 1963

3,079,373
2-NITRO-4-TRIFLUOROMETHYLBENZENEAZO-2'-HYROXY-3'-NAPHTHAMIDE COMPOUNDS
James M. Straley and Raymond C. Harris, Kingsport, Tenn., assignors to Eastman Kodak Company, Rochester, N.Y., a corporation of New Jersey
No Drawing. Filed June 30, 1960, Ser. No. 39,796
6 Claims. (Cl. 260—152)

This invention relates to new water insoluble monoazo compounds and their application to the dyeing or coloring of polyacrylonitrile materials, especially polyacrylonitrile textile materials.

We have discovered that the water insoluble azo compounds having the formula:

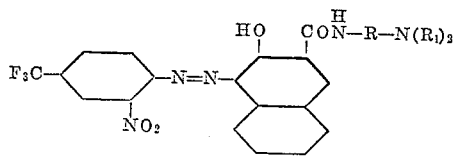

wherein R represents an alkylene radical selected from the group consisting of $-CH_2CH_2-$, $-CH_2CH_2CH_2-$ and $-CH_2CHOHCH_2-$, $R_1$ represents an alkyl radical having 1 to 4 carbon atoms and wherein $N(R_1)_2$ collectively represents a member selected from the group consisting of a morpholinyl radical and a piperidyl radical, are valuable dyes for polyacrylonitrile materials, especially polyacrylonitrile textile materials. They yield attractive orange dyeings thereon which have good to excellent fastness to light, gas, washing and sublimation.

The new water insoluble azo compounds of our invention are prepared by diazotizing 2-nitro-4-trifluoromethylaniline and coupling the diazonium compound obtained with a 2-hydroxy-3-naphthamide compound having the formula:

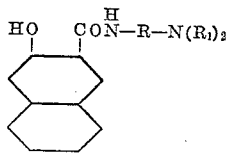

wherein R, $R_1$ and $N(R_1)_2$ have the meaning previously assigned to them. The diazotization and coupling reactions are carried out in accordance with known procedures.

2-hydroxy-3-N-(β-dimethylaminoethyl)naphthamide,
2-hydroxy-3-N-(β-diethylaminoethyl)naphthamide,
2-hydroxy-3-N-(β-di-n-propylaminoethyl)naphthamide,
2-hydroxy-3-N-(β-di-n-butylaminoethyl)naphthamide,
2-hydroxy-3-N-(γ-dimethylaminopropyl)naphthamide,
2-hydroxy-3-N-(γ-diethylaminopropyl)naphthamide,
2-hydroxy-3-N-(γ-di-n-propylaminopropyl)naphthamide,
2-hydroxy-3-N-(γ-di-n-butylaminopropyl)naphthamide,
2-hydroxy-3-N-(β-morpholinylethyl)naphthamide,
2-hydroxy-3-N-(γ-morpholinylpropyl)naphthamide,
2-hydroxy-3-N-(β-piperidylethyl)naphthamide,
2-hydroxy-3-N-(γ-piperidylpropyl)naphthamide,
2-hydroxy-3-N-(γ-dimethylamino-β-hydroxypropyl)naphthamide,
2-hydroxy-3-N-(γ-diethylamino-β-hydroxypropyl)naphthamide,
2-hydroxy-3-N-(γ-di-n-butylamino-β-hydroxypropyl)naphthamide,
2-hydroxy-3-N-(γ-piperidyl-β-hydroxypropyl)naphthamide, and
2-hydroxy-3-N-(γ-morpholinyl-β-hydroxypropyl)naphthamide are illustrative of the coupling components used in preparing the azo dyestuffs of our invention.

The coupling components can be prepared by reacting 2-hydroxy-3-naphthoic acid chloride or 2-acetoxy-3-naphthoic acid cholride with an amine having the formula:

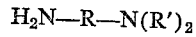

wherein R, R' and $N(R')_2$ have the meaning previously assigned to them. When 2-acetoxy-3-naphthoic acid chloride is employed the acetyl group is split off by known methods after the reaction with the amine is complete.

The following examples illustrate the azo compounds of our invention and their manner of preparation.

*Example 1*

0.142 gram of sodium nitrite was added to 5 cc. of 95% sulfuric acid. The temperature rose to 70° C. The nitrosylsulfuric acid solution thus obtained was cooled to 0° C. and then added to 10 cc. of propionic-acetic (1:5) acid below 10° C. A solution of 0.412 gram of 2-nitro-4-trifluoromethylaniline in 10 cc. of propionic-acetic (1:5) acid was added, with stirring, at 0° C. The reaction mixture resulting was stirred for 2 hours at 0° C. The diazonium solution obtained as described above was added, with stirring, at a temperature below 5° C. to 0.52 gram of 2-hydroxy-3-N-(γ-dimethylaminopropyl) naphthamide in 20 cc. of propionic-acetic (1:5) acid. Upon completion of the coupling reaction which takes place the mineral acid present was made neutral to Congo red by the addition of sodium acetate and the reaction mixture was allowed to stand for 2 hours without further cooling. The acid was completely neutralized with sodium carbonate. The dye compound formed was recovered by filtration, washed well with water and dried. The dye compound thus obtained has the formula:

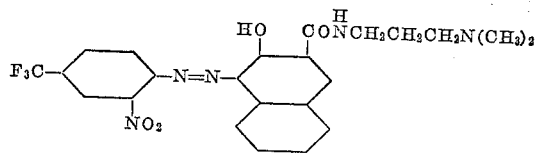

It dyes polyacrylonitrile materials such as Verel and Orlon 42 acrylic fibers fast orange shades.

*Example 2*

0.412 gram of 2-nitro-4-trifluoromethylaniline was diazotized and the diazonium compound obtained was coupled with 0.53 gram of 2-hydroxy-3-N-(β-diethylaminoethyl)naphthamide. Diazotization, coupling and recovery of the dye compound formed were carried out in accordance with the procedure described in Example 1. The dye compound obtained dyes polyacrylonitrile materials such as Verel and Orlon 42 acrylic fibers fast orange shades.

*Example 3*

0.412 gram of 2-nitro-4-trifluoromethylaniline was diazotized and the diazonium compound obtained was coupled with 0.52 gram of 2-hydroxy-3-N-(β-dimethylaminoethyl)naphthamide. Diazotization, coupling and recovery of the dye compound formed were carried out in accordance with the procedure described in Example 1. The dye compound obtained dyes polyacrylonitrile materials such as Verel and Orlon 42 acrylic fibers fast orange shades.

*Example 4*

0.412 gram of 2-nitro-4-trifluoromethylaniline was diazotized and the diazonium compound obtained was coupled with 0.63 gram of 2-hydroxy-3-N-(β-hydroxy-γ-diethylaminopropyl)naphthamide. Diazotization, coupling and recovery of the dye compound formed were carried out in accordance with the procedure described in Example 1. The dye compound obtained dyes polyacrylonitrile materials such as Verel and Orlon 42 acrylic fibers fast orange shades.

*Example 5*

0.412 gram of 2-nitro-4-trifluoromethylaniline was diazotized and the diazonium compound obtained was coupled with 0.66 gram of 2-hydroxy-3-N-(γ-morpholinylpropyl)naphthamide. Diazotization, coupling and recovery of the dye compound formed were carried out in accordance with the procedure described in Example 1. The dye compound obtained dyes polyacrylonitrile materials such as Verel and Orlon 42 acrylic fibers fast orange shades.

*Example 6*

0.412 gram of 2-nitro-4-trifluoromethylaniline was diazotized and the diazonium compound obtained was coupled with 0.71 gram of 2-hydroxy-3-N-(γ-di-n-butylaminopropyl)naphthamide. Diazotization, coupling and recovery of the dye compound formed were carried out in accordance with the procedure described in Example 1. The dye compound obtained dyes polyacrylonitrile materials such as Verel and Orlon 42 acrylic fibers fast orange shades.

*Example 7*

0.412 gram of 2-nitro-4-trifluoromethylaniline was diazotized and the diazonium compound obtained was coupled with 0.63 gram of 2-hydroxy-3-N-(β-di-n-propylaminoethyl)naphthamide. Diazotization, coupling and recovery of the dye compound formed were carried out in accordance with the procedure described in Example 1. The dye compound obtained dyes polyacrylonitrile materials such as Verel and Orlon 42 acrylic fibers fast orange shades.

*Example 8*

0.412 gram of 2-nitro-4-trifluoromethylaniline was diazotized and the diazonium compound obtained was coupled with 0.68 gram of 2-hydroxy-3-N-(β-di-n-butylaminoethyl)naphthamide. Diazotization, coupling and recovery of the dye compound formed were carried out in accordance with the procedure described in Example 1. The dye compound obtained dyes polyacrylonitrile materials such as Verel and Orlon 42 acrylic fibers fast orange shades.

*Example 9*

0.412 gram of 2-nitro-4-trifluoromethylaniline was diazotized and the diazonium compound obtained was coupled with 0.60 gram of 2-hydroxy-3-N-(β-morpholinylethyl)naphthamide. Diazotization, coupling and recovery of the dye compound formed were carried out in accordance with the procedure described in Example 1. The dye compound obtained dyes polyacrylonitrile materials such as Verel and Orlon 42 acrylic fibers fast orange shades.

*Example 10*

0.412 gram of 2-nitro-4-trifluoromethylaniline was diazotized and the diazonium compound obtained was coupled with 0.60 gram of 2-hydroxy-3-N-(β-piperidylethyl)naphthamide. Diazotization, coupling and recovery of the dye compound formed were carried out in accordance with the procedure described in Example 1. The dye compound obtained dyes polyacrylonitrile materials such as Verel and Orlon 42 acrylic fibers fast orange shades.

*Example 11*

0.412 gram of 2-nitro-4-trifluoromethylaniline was diazotized and the diazonium compound obtained was coupled with 0.60 gram of 2-hydroxy-3-N-(γ-diethylaminopropyl)naphthamide. Diazotization, coupling and recovery of the dye compound formed were carried out in accordance with the procedure described in Example 1. The dye compound obtained dyes polyacrylonitrile materials such as Verel and Orlon 42 acrylic fibers fast orange shades.

*Example 12*

0.412 gram of 2-nitro-4-trifluoromethylaniline was diazotized and the diazonium compound obtained was coupled with 0.62 gram of 2-hydroxy-3-N-(γ-piperidylpropyl)naphthamide. Diazotization, coupling and recovery of the dye compound formed were carried out in accordance with the procedure described in Example 1. The dye compound obtained dyes polyacrylonitrile materials such as Verel and Orlon 42 acrylic fibers fast orange shades.

*Example 13*

0.412 gram of 2-nitro-4-trifluoromethylaniline was diazotized and the diazonium compound obtained was coupled with 0.58 gram of 2-hydroxy-3-N-(β-hydroxy-γ-dimethylaminopropyl)naphthamide. Diazotization, coupling and recovery of the dye compound formed were carried out in accordance with the procedure described in Example 1. The dye compound obtained dyes polyacrylonitrile materials such as Verel and Orlon 42 acrylic fibers fast orange shades.

*Example 14*

0.412 gram of 2-nitro-4-trifluoromethylaniline was diazotized and the diazonium compound obtained was coupled with 0.66 gram of 2-hydroxy-3-N-(β-hydroxy-γ-morpholinylpropyl)naphthamide. Diazotization, coupling and recovery of the dye compound formed were carried out in accordance with the procedure described in Example 1. The dye compound obtained dyes polyacrylonitrile materials such as Verel and Orlon 42 acrylic fibers fast orange shades.

*Example 15*

0.412 gram of 2-nitro-4-trifluoromethylaniline was diazotized and the diazonium compound obtained was coupled with 0.66 gram of 2-hydroxy-3-N-(β-hydroxy-γ-piperidylpropyl)naphthamide. Diazotization, coupling and recovery of the dye compound formed were carried out in accordance with the procedure described in Example 1. The dye compound obtained dyes polyacrylonitrile materials such as Verel and Orlon 42 acrylic fibers fast orange shades.

*Example 16*

188 grams of 2-hydroxy-3-naphthoic acid were slurried in 1000 cc. of dry benzene. A solution of 122 grams of $SOCl_2$ in 500 cc. of dry benzene was added over a period of 30 to 45 minutes. The reaction mixture resulting was stirred for 2.5 hours at room temperature, then raised slowly to 60° C. and held at this temperature until a clear solution resulted (about 2 hours). The excess $SOCl_2$, $SO_2$ and HCl was removed under vacuum while keeping the pot temperature at 60° C. or below. The last traces of $SOCl_2$, $SO_2$ and HCl were removed by passing a slow stream of dry air through the reaction mixture for about 15 minutes. The reaction mixture was cooled to 25° C. and 138 grams of anhydrous $K_2CO_3$ were added, after which a solution of 110 grams of 3-dimethylaminopropylamine in 300 cc. of dry benzene was added dropwise while keeping the pot temperature at 60° C. or below. The reaction mixture was stirred 6 hours longer at room temperature, then raised to 65° C. and filtered hot. The material collected on the filter was washed with three 2-liter portions of hot benzene. The combined filtrates were concentrated under vacuum to ⅓ their volume below 70° C. The reaction mixture was cooled to room temperature. The desired product which precipitated was recovered by filtration. A yield of 240 grams of 2-hydroxy-3-N-(γ-dimethylaminopropyl)naphthamide melting at 143° C. to 145° C. was obtained.

*Example 17*

Example 16 was repeated using 155 grams of γ-morpholinylpropylamine in place of 3-dimethylaminopropylamine. 2 - hydroxy - 3-N-(γ-morpholinylpropyl)naphthamide having a melting point of 131° C. to 135° C. was obtained.

*Example 18*

Example 16 was repeated using 152 grams of γ-piperidylpropylamine in place of 3-dimethylaminopropylamine. 2-hydroxy-3-N-(γ-piperidylpropyl)naphthamide having a melting point of 140 to 144° C. was obtained.

*Example 19*

29 cc. of 3-diethylamino-2-hydroxypropylamine in 50 cc. of dry benzene were added dropwise, with vigorous agitation, over a period of 1 hour to a solution of 20.65 grams of 2-hydroxy-3-naphthoyl chloride in 100 cc. of dry benzene at 70° C. When the addition was complete the temperature of the reaction mixture was raised to 80 to 85° C. and stirring was continued for one hour. The reaction mixture was then allowed to cool to 25° C. and the lumpy precipitate was ground under the mother liquor. The solid reaction product was allowed to settle and then the liquid layer was removed by decantation. The crude reaction product was dried 6 hours in a 60° C. oven then dispersed in 5 liters of water containing 150 cc. of concentrated hydrochloric acid. The temperature was raised to 80° C. and the mixture stirred at this temperature for 30 minutes. Any suspended solids were then removed by gravity filtration and the filtrate was made basic with an aqueous solution of sodium bicarbonate. The purified reaction product was recovered by filtration, washed well with water and dried at 60° C. 20 grams of 2-hydroxy-3-N-(γ-diethylamino-2-hydroxypropyl)naphthamide melting at 170° C. to 175° C. were thus obtained.

Following the general procedure described in the examples just given the other naphthamide coupling components are readily prepared. Many of the naphthamide coupling components employed in the preparation of the new azo compounds of our invention tend to be obtained as sticky solids.

The primary amines having the formula:

$$H_2N-R-N(R')_2$$

used in preparing the naphthamide compounds employed in the preparation of the azo compounds of our invention appear to include new as well as old compounds. Many of these amines are specifically disclosed in the prior art. Those not specifically disclosed can be prepared by the methods used to prepare the known compounds. 3-dimethylaminopropylamine is an article of commerce.

Three general processes by which primary amines having the formula:

$$H_2N-R-N(R')_2$$

can be prepared are set forth hereinafter.

(1) An amine having the formula:

$$H_2N(R')_2$$

is condensed with a chloroalkylnitrile having the formula $Cl(CH_2)_xCN$, and the product obtained is reduced by sodium-alcohol or with hydrogen over Raney nickel to give the desired product:

$$H_2N(CH_2)_{x+1}N(R')_2$$

(2) Potassium phthalimide is condensed with a dibromoalkyl compound having the formula: $Br(CH_2)_zBr$ to obtain $C_6H_4(CO)_2N(CH_2)_zBr$ which is treated with an amine having the formula $H_2N(R')_2$ to give $$C_6H_4(CO)_2N(CH_2)_zN(R')_2$$

which is hydrolyzed with dilute mineral acid to give $H_2N(CH_2)_zN(R')_2$ the desired product. Method 2 is the well-known Gabriel synthesis.

(3) A secondary amine is added to an unsaturated nitrile, e.g. methacrylonitrile, and the product is hydrogenated to the desired primary amine.

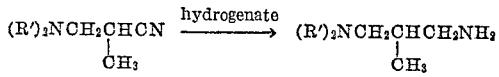

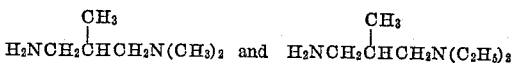

for example, can be readily prepared by method 3 by reacting dimethylamine and diethylamine, respectively, with methacrylonitrile and then hydrogenating the products obtained to their primary amine form.

R, R' and $N(R')_2$ as used herein have the meaning previously assigned to them, while $x$ is 1, 2 or 3 and $z$ is 2, 3 or 4.

The new monoazo dyestuffs of our invention can be applied to acrylonitrile polymers, such as polyacrylonitrile and acrylonitrile graft polymers, in the form of an aqueous dispersion.

The following example illustrates one satisfactory way in which the new monoazo dyestuffs can be used to dye an acrylonitrile polymer textile material. .1 gram of dye is dissolved by warming in 5 cc. of methyl Cellosolve. A 2% aqueous solution of a nonionic surfactant, such as Igepal CA (a polymerized ethylene oxide-alkylphenol condensation product), is added slowly until a fine emulsion is obtained and then the dye mixture is brought to a volume of 200 cc. with warm water. 5 cc. of a 5% aqueous solution of formic acid or acetic acid are added and then 10 grams of fabric made from an acrylic fiber are entered and in the case of Orlon 42 the dyeing is carried out at the boil for one hour. In the case of materials made of Verel acrylic fiber the dyebath temperature should not exceed 90° C. in order to avoid damage to the fiber. The dyed material is then washed well with hot water and dried.

The foregoing dyeing example is merely illustrative of the manner in which the new monoazo dyestuffs of our invention can be applied to acrylonitrile polymer textile materials. Larger or smaller amounts of the dyestuffs can be employed, for example. Similarly, dyeing assistants other than Igepal CA can be employed.

Ordinarily, the polyacrylonitrile material is a textile material in fiber, filament, yarn or cloth form, for example. However, the polyacrylonitrile can be in another form, such as sheet or film form, for example. Among the acrylonitrile polymers that can be dyed or colored with the azo compounds of our invention are those disclosed in Straley and Giles U.S. Patent 2,857,372, issued October 21, 1958.

The water insoluble azo compounds of our invention are devoid of water-solubilizing groups such as the sulfonic and carboxylic acid groups, for example.

The expression "propionic-acetic (1:5) acid" refers to a mixture of propionic and acetic acids in which there are five parts by volume of acetic acid to 1 part by volume of propionic acid.

The invention has been described in detail with particular reference to preferred embodiments thereof, but it will be understood that variations and modifications can be effected within the spirit and scope of the invention as described hereinabove and as defined in the appended claims.

We claim:

1. A water insoluble azo compound having the formula:

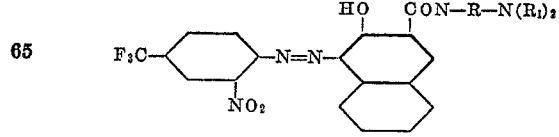

wherein R represents an alkylene radical selected from the group consisting of $-CH_2CH_2-$, $-CH_2CH_2CH_2-$ and $-CH_2CHOHCH_2-$, $R_1$ represents an alkyl radical having 1 to 4 carbon atoms and wherein $N(R_1)_2$ collectively represents a member selected from the group consisting of a morpholinyl radical and a piperidyl radical.

2. The water insoluble azo compound having the formula:

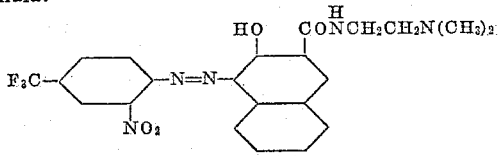

3. The water insoluble azo compound having the formula:

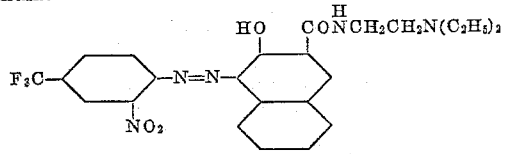

4. The water insoluble azo compound having the formula:

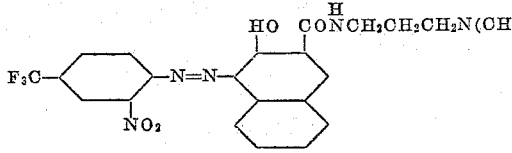

5. The water insoluble azo compound having the formula:

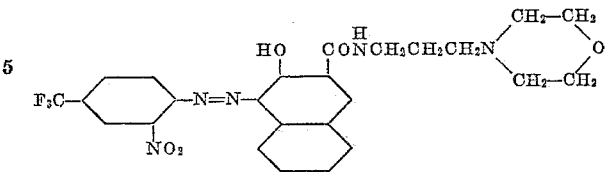

6. The water insoluble azo compound having the formula:

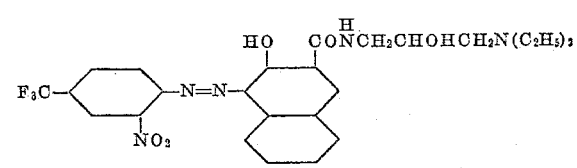

References Cited in the file of this patent
UNITED STATES PATENTS

| | | |
|---|---|---|
| 2,128,255 | Krzikalla et al. | Aug. 30, 1938 |
| 2,717,823 | Lowe | Sept. 13, 1955 |
| 2,891,942 | Merian | June 23, 1959 |